United States Patent Office 2,904,593
Patented Sept. 15, 1959

2,904,593
PREPARATION OF 4-OCTENE-2,7-DIONE

Charles D. Robeson and Albert J. Chechak, Rochester, N.Y., assignors to Eastman Kodak Company, Rochester, N.Y., a corporation of New Jersey No Drawing. Application April 17, 1957
Serial No. 653,297

7 Claims. (Cl. 260—593)

The present invention is concerned with the preparation of 4-octene-2,7-dione.

The unsaturated diketone, 4-octene-2,7-dione, is particularly valuable for use in the synthesis of various carotenoids such as beta-carotene, lycopene and other related polyene hydrocarbons. The preparation of beta-carotene from 4-octene-2,7-dione, is described in German Patent No. 818,942. There have been several proposed syntheses for 4-octene-2,7-dione. However, these proposed syntheses have either been low yielding, yields of less than 5% being common, or such syntheses have required the use of such materials as lithium aluminum hydride which are hazardous to use. Thus, 4-octene-2,7-dione is expensive and not widely available in sizable quantities.

It is an object of the present invention to provide an improved method for preparing 4-octene-2,7-dione.

It is a further object of this invention to prepare 4-octene-2,7-dione by a new combination of method steps.

It is likewise an object of this invention to prepare 4-octene-2,7-dione from relatively simple and commercially available starting materials.

Other objects will be apparent from the description and claims which follow.

These and other objects of the invention are attained by the process which comprises: ethynylating sorbaldehyde to form the 3-carbinol, 4,6-octadiene-1-yn-3-ol, subjecting this 3-carbinol to allylic rearrangement to form the 7-carbinol, 3,5-octadiene-1-yn-7-ol, converting this 7-carbinol structure to 3,5-octadiene-2,7-dione, with process steps which include oxidation and hydration steps, and thereafter partially hydrogenating the resulting 3,5-octadiene-2,7-dione to form 4-octene-2,7-dione. The present synthesis is illustrated by the following reactions and equations.

$$CH_3-CH=CH-CH=CH-CHO + HC\equiv CH$$

$$\downarrow$$

$$CH_3-CH=CH-CH=CH-\underset{\underset{OH}{|}}{CH}-C\equiv CH$$

Compound I $$\downarrow$$

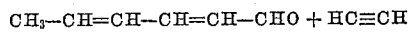

Compound II

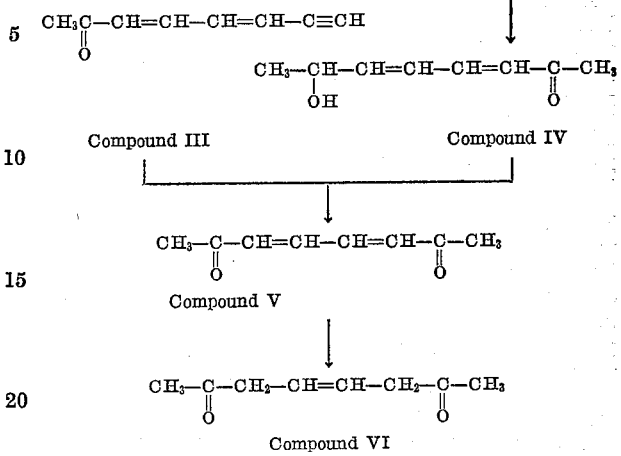

Compound VI

The ethynylation of sorbaldehyde can be effected by first reacting acetylene and an amide of such basic metals as lithium, sodium, potassium and calcium to form an acetylide. The resulting basic metal acetylide can thereafter be condensed with sorbaldehyde to form a basic metal complex which can be readily hydrolyzed to Compound I, 4,6-octadiene-1-yn-3-ol, by the addition of water, dilute acid, or ammonium salt solution. The basic metal amide can be added to the reaction mixture as such to react with the acetylene, or it can be formed in situ by employing liquid ammonia as a solvent and adding the basic metal thereto. In forming the basic metal amide in situ, a trace amount (e.g. 10 mg.) of ferric nitrate is usually added to catalyze or accelerate the reaction, although such catalyst materials are not necessary to effect the reaction. Also, an acetylenic Grignard reagent having the formula $CH\equiv CM_gX$, wherein X is a halogen atom, can be condensed with sorbaldehyde, the resulting complex being hydrolyzed in the manner described above to produce Compound I.

The ethynylation of sorbaldehyde by means of a basic metal acetylide, an acetylenic Grignard reagent, or with related reactants, is effected in the usual manner with regard to reaction conditions. Sufficient acetylide or Grignard reagent is added to the reaction mixture to condense with substantially all of the sorbaldehyde, the presence of excess acetylide or Grignard reagent in the reaction mixture not deleteriously affecting the reaction. The present ethynylation is effected in a solven substantially inert to sorbaldehyde, the acetylide or the Grignard reactants and the product of the reaction. Suitable solvents include diethyl ether, toluene, benzene, and the like. As pointed out above, liquid ammonia can be used as the solvent when a basic metal acetylide is employed in the present process. Temperatures ranging from about room temperature up to the reflux temperature of the solvent are more usually employed in the condensation reaction of sorbaldehyde and the acetylide or Grignard reagent. When liquid ammonia is employed as the solvent for the reaction, the temperature of the liquid ammonia is the reaction temperature. The condensation reaction is effected until substantially all of the sorbaldehyde is reacted, with reaction times ranging from about ½ hour to about 5 hours being typical reaction periods. As used herein, the terms "ethynylation," "ethynylated" and "ethynylating" refer to the addition of acetylene to sorbaldehyde to form Compound I, 4,6-octadiene-1-yn-3-ol.

Compound I is thereafter subjected to an allylic rearrangement to form Compound II, 3,5-octadiene-1-yn-7-ol. An aqueous acid solution is preferably employed. Typical of such acids are sulfuric acid, hydrochloric acid, phosphoric acid, formic acid, acetic acid, trichloroacetic acid and comparable acidic materials. Aqueous solutions of acids in concentrations of from about 0.5% to about 20% acid can be suitably employed, a concentration of about 5% acid being a typical concentration. The present allylic rearrangement can be effected by merely associating, preferably with constant stirring or agitation, Compound I with the aqueous acid until substantially all of Compound I is rearranged to Compound II. Reaction times vary with such variants as the temperature, concentration of the acid and the degree of stirring or agitation of the reactants. Reaction times usually range from about 1 hour to 15 hours, or even to 20 hours. With extended reaction times, it is desirable to add a small amount of an antioxidant material such as hydroquinone, butylated hydroxy anisole, butylated hydroxy toluene, and related materials, to the reaction mixture, as well as to effect the reaction in an inert atmosphere such as nitrogen. The rearrangement can be effected at room temperature although elevated temperatures up to reflux temperatures can be used to increase the rate of the reaction.

In the present synthesis, Compound II can be treated by either of two closely related sequences of process steps to form Compound V, 3,5-octadiene-2,7-dione. Compound II can be oxidized to form Compound III, 3,5-octadiene-1-yn-7-one, which can thereafter be hydrated to form Compound V. In alternative, Compound II can be hydrated to form Compound IV, 3,5-octadiene-2-one-7-ol, which can thereafter be oxidized to form Compound V.

The oxidation of Compound II to Compound III and the oxidation of Compound IV to Compound V are preferably effected with a slurry of manganese dioxide in an organic solvent substantially inert to the reactants and the resulting reaction products, such solvents as diethyl ether, acetone, methyl ethyl ketone, benzene, hexane, toluene, and the like being typical solvents suitable for the reaction. Likewise, the present oxidations can be effected with such oxidizing agents as tertiary butyl chromate and the like, or by an Oppenauer oxidation with an aluminum tertiary alkoxide in the presence of a hydrogen accepter. A substantial excess of oxidizing agent is desirably employed to assure a substantially complete oxidation of the carbinol group of Compound II or Compound IV to a ketone group. With the preferred manganese dioxide oxidizing agent, the oxidation can be suitably effected at room temperature by merely stirring or associating the oxidizing agent with the carbinol compound to be oxidized, although temperatures up to the reflux temperature of the solvent employed can be used to increase the rate of the reaction. The oxidation is continued until the carbinol groups of Compound II and Compound IV are substantially completely oxidized to the ketone groups of Compound III and Compound V respectively. Typical reaction times range from about 1 hour to 24 hours, and more generally from about 10 hours to 20 hours.

The acetylenic bonds in Compound II and in Compound III are hydrated with one molecule of water to form a ketone group in the respective compounds. Such hydrations can be effected with aqueous solutions containing hydration catalysts comprised of acidic materials like sulfuric acid, phosphoric acid, formic acid, and the like, in combination with mercury compounds such as mercuric oxide and mercuric sulfate. Mixtures of about 0.5% to 10% of acid in combination with about 20% to 50% of mercury compound based on the weight of the acetylenic compound are more usually employed, although the amount of catalyst can be suitably varied even further, such variables as the particular catalyst, the solvent and the temperature of the reaction affecting the amount of catalyst that can be suitably used. The reaction is more generally effected in an aqueous medium such as aqueous methanol, aqueous acetone and other aqueous solvent systems that are substantially inert to the reactants and the resulting reaction products. Likewise, the reaction can be effected in an aqueous medium containing a mercury compound and a major amount of an organic acid such as formic acid. The amount of mercury compound in such an aqueous organic acid medium is usually varied between about 1% and 10% by weight of the acetylenic compound. Likewise, such hydration catalysts as perchloric acid and boron fluoride can be utilized with or without mercury compounds in accordance with usual hydration practice. The hydrations can be effected at room temperature although elevated temperatures up to the reflux temperature of the solvent are more generally employed to increase the rate of the reaction. The hydration reaction is allowed to proceed until substantially all of the acetylenic bond is hydrated to a ketone group. Reaction times usually range from about 15 minutes to about 5 hours, the time of reaction varying with the reaction temperature, the type and amount of hydration catalyst, the amount of stirring or agitation, and related reaction variables.

Compound V can be readily converted to Compound VI, 4-octene-2,7-dione, by partial hydrogenation. Such a partial hydrogenation can be effected in an amine solvent, such as pyridine, containing metal-acid combinations which are capable of generating hydrogen. The combination of zinc dust and an acid such as acetic acid is a typical metal-acid combination that can be suitably employed. Compound V is hydrogenated under carefully controlled reaction conditions to minimize the complete hydrogenation of Compound V. Accordingly, the partial hydrogenation is preferably effected at depressed temperatures, such as from about 0° C. to room temperature. Reaction times usually vary from about 5 minutes to about 30 minutes.

No particular purification methods are needed to treat the products of the intermediate process steps of the present synthesis prior to subjecting these products to subsequent process steps. However, it is common practice to purify or "work-up" Compound I, II, III and IV by distillation under vacuum, and Compound V as well as the final product, Compound VI, by crystallization from organic solvents at depressed temperatures. Likewise, other well-known purification methods such as chromatography can be employed to "work-up" the intermediate products and the final product of the instant synthesis.

The invention is illustrated by the following examples of preferred embodiments thereof.

EXAMPLE 1

*Preparation of compound I*

A 9 gram sample of lithium metal was added to 3 liters of liquid ammonia in a 3-necked round bottom flask cooled with a Dry Ice-acetone bath and fitted with a Dry Ice-acetone reflux condenser, mechanical stirrer, dropping funnel, and an acetylene inlet tube. A trace (about 10 mg.) of ferric nitrate was added and the mixture was stirred at about −50° C. until the resulting blue color disappeared. Acetylene was passed into the resulting mixture under agitation for about 2 hours. Thereafter, 96.1 grams of sorbaldehyde were added dropwise over a period of 30 minutes. The resulting mixture was stirred for one hour, 80 grams of solid ammonium chloride slowly added, the resulting ammonia gas evaporated, and the reaction mixture extracted with an equal volume of diethyl ether. The ether solution was washed three times with one-quarter its volume of saturated ammonium chloride solution, three times similarly with saturated sodium chloride solution and thereafter dried over anhydrous sodium sulfate. The ether was removed by distillation in vacuo to give 122 grams of 4,6-octadiene-1-yn-3-ol having $$E_{1\ cm.}^{1\%} (229\ m\mu) = 2289$$

representing a yield of 96%.

EXAMPLE 2

*Preparation of compound II from compound I*

The product of Example 1, 122 grams of 4,6-octadiene-1-yn-3-ol, and 610 cc. of 5% aqueous sulfuric acid containing about 0.1 g. of hydroquinone antioxidant were shaken for three hours in an inert nitrogen atmosphere at about 25° C. The reaction mixture was then neutralized with aqueous sodium bicarbonate and thereafter extracted with an equal volume of diethyl ether. The resulting ether extraction was washed three times with one-quarter its volume of saturated aqueous sodium chloride solution and then dried over anhydrous sodium sulfate. The ether was removed distillation yielding 122 grams of 3,5-octadiene-1-yn-7-ol having $$E_{1\ cm.}^{1\%} (259\ m\mu) = 2326$$

corresponding to a yield of 93.6%.

EXAMPLE 3

*Preparation of compound III from compound II*

A 100 gram portion of the compound prepared in Example 2, 3,5-octadiene-1-yn-ol, was dissolved in 1.4 liters of diethyl ether, and to this mixture was slowly added 1.3 kilograms of powdered manganese dioxide. The resulting mixture was allowed to stand for 16 hours at 25° C., and thereafter filtered, and the filter cake washed on the filter with about 500 cc. of diethyl ether. The ether was distilled from the resulting combined filtrates to yield 88.1 grams of 3,5-octadiene-1-yn-7-one having $$E_{1\ cm.}^{1\%} (290\ m\mu) = 2010$$

for a yield of 80%.

EXAMPLE 4

*Preparation of compound V from compound III*

To a solution of 100 grams of 3,5-octadiene-1-yn-7-one prepared by the method described in Example 3, in 500 cc. of 85% aqueous methanol containing 1.34 grams of sulfuric acid, was added a mixture of 5 grams of mercuric oxide and 30 grams of mercuric sulfate. The resulting mixture was refluxed for 30 minutes, cooled, and extracted three times with one-quarter its volume of diethyl ether. The combined ether extracts were washed with one-quarter their volume of saturated aqueous sodium chloride solution, dried over anhydrous sodium sulfate and concentrated to a volume of approximately 200 cc. On cooling the resulting concentrate to −20° C., 64.3 grams of crystalline 3,5-octadiene-2,7-dione having $$E_{1\ cm.}^{1\%} (275\ m\mu) = 2435$$

for a yield of 56% resulted.

EXAMPLE 5

*Preparation of compound V from compound III*

To a solution of 5 grams of mercuric sulfate in 500 cc. of 85% aqueous formic acid was slowly added 100 grams of 3,5-octadiene-1-yn-7-one prepared by the method described in Example 3. The resulting mixture was stirred for 2 hours at room temperature and thereafter for 30 minutes at 50° C. After cooling to 25° C., the reaction mixture was diluted with about one-half its volume of diethyl ether and the resulting crystallized inorganic salts in the reaction mixture filtered off. The ether and the formic acid were then distilled off in vacuo, and the residue, after the addition of about 100 cc. of saturated aqueous sodium chloride solution, was extracted with an equal volume of chloroform. The chloroform extract was washed with an equal volume of saturated aqueous sodium bicarbonate solution and dried over anhydrous sodium sulfate. The chloroform was distilled off in vacuo and the resulting residue crystallized from twice its volume of diethyl ether to yield 66.5 grams of 3,5-octadiene-2,7-dione having $$E_{1\ cm.}^{1\%} (275\ m\mu) = 2435$$

for a yield of 58%.

EXAMPLE 6

*Preparation of compound IV from compound II*

To a 2.5 gram sample of the product prepared in Example 2, 3,5-octadiene-1-yn-7-ol, was slowly added with agitation a cooled mixture (5° C.) containing 0.26 grams of mercuric oxide, 1.7 cc. of sulfuric acid, 10 cc. of water and 1.5 cc. of ethanol. The temperature of the reaction mixture was allowed to rise to 25° C. over a period of 1.75 hours with continuous stirring. The mixture was then diluted with 100 cc. of diethyl ether, filtered, and the resulting ether layer washed with one-quarter its volume of saturated aqueous sodium chloride solution. After drying the ether solution over anhydrous sodium sulfate, the ether was removed by distillation. A 2.5 gram residue having $$E_{1\ cm.}^{1\%} (270\ m\mu) = 1300$$

resulted which contained approximately 50% of 3,5-octadiene-7-ol-2-one.

EXAMPLE 7

*Preparation of compound V from compound IV*

To a 2 gram sample of the product prepared in Example 6, 3,5-octadiene-7-ol-2-one, dissolved in 15 cc. of diethyl ether was added 15 grams of powdered manganese dioxide. The resulting reaction mixture was left at 25° C. for 18 hours, filtered, and the filter cake washed on the filter with 50 cc. of diethyl ether. The ether was removed from the resulting combined filtrates to yield 1.88 grams of 3,5-octadiene-2,7-dione having $$E_{1\ cm.}^{1\%} (274\ m\mu) = 861$$

for a yield of approximately 40%

EXAMPLE 8

*Preparation of compound VI from compound V*

To a cooled (5° C.) solution of 5 grams of the compound produced in Example 4, 3,5-octadiene-2,7-dione, in 50 cc. of pyridine containing 10 cc. of glacial acetic acid was added 5 grams of zinc dust. The temperature of the resulting mixture was allowed to rise to 25° C. over a period of about 10 minutes. This mixture was filtered, poured into 350 cc. of 2 N. sulfuric acid and extracted three times with 125 cc. portions of diethyl ether. The combined ether extracts were washed to neutrality with saturated aqueous sodium chloride portions, dried over anhydrous sodium sulfate and the ether removed by distillation under reduced pressure to yield 3.6 grams of 4-octene-2,7-dione having a melting point of 31–32° C. for a yield of 71%.

Although the invention has been described in considerable detail with reference to certain preferred embodiments thereof, it will be understood that variations and modifications can be effected within the spirit and scope of the invention as described hereinabove and as defined in the appended claims.

We claim:

1. The process which comprises condensing sorbaldehyde with acetylene to form the 3-carbinol, 4,6-octadiene-1-yn-3-ol; subjecting said 3-carbinol to allylic rearrangement in the presence of an aqueous acid to form the 7-carbinol, 3,5-octadiene-1-yn-7-ol; converting said 7-carbinol to 3,5-octadiene-2,7-dione, by process steps including oxidation and hydration steps effective to oxidize the carbinol group in the said 7-carbinol structure to a ketone group and to add one mole proportion of water to the acetylenic bond in the said 7-carbinol structure to form a ketone group on the 2-carbon atom; and thereafter partially hydrogenating the resulting 3,5-octadiene-2,7-dione with one mole proportion of hydrogen to form 4-octene-2,7-dione.

2. The process which comprises condensing sorbaldehyde with acetylene to form the 3-carbinol, 4,6-octadiene-1-yn-3-ol; subjecting said 3-carbinol to allylic rearrangement in the presence of an aqueous acid to form the 7-carbinol, 3,5-octadiene-1-yn-7-ol; oxidizing said 7-carbinol to the 7-ketone, 3,5-octadiene-1-yn-7-one; hydrating the acetylenic bond of said 7-ketone with one mole proportion of water to form 3,5-octadiene-2,7-dione; and thereafter partially hydrogenating the resulting 3,5-octadiene-2,7-dione with one mole proportion of hydrogen to form 4-octene-2,7-dione.

3. The process which comprises reacting sorbaldehyde with a basic metal acetylide to form the 3-carbinol, 4,6-octadiene-1-yn-3-ol; subjecting said 3-carbinol to allylic rearrangement in the presence of an aqueous acid to form the 7-carbinol, 3,5-octadiene-1-yn-7-ol; oxidizing said 7-carbinol in the presence of manganese dioxide to form the 7-ketone, 3,5-octadiene-1-yn-7-one; hydrating the acetylenic bond of said 7-ketone with one mole proportion of water in an aqueous medium containing an acidic material and a mercury compound to form 3,5-octadiene-2,7-dione; and thereafter partially hydrogenating the resulting 3,5-octadiene-2,7-dione with one mole proportion of hydrogen to form 4-octene-2,7-dione.

4. The process which comprises condensing sorbaldehyde with acetylene to form the 3-carbinol, 4,6-octadiene-1-yn-3-ol; subjecting said 3-carbinol to allylic rearrangement in the presence of an aqueous acid to form the 7-carbinol, 3,5-octadiene-1-yn-7-ol; hydrating the acetylenic bond of said 7-carbinol with one mole proportion of water to form the 2-ketone, 3,5-octadiene-2-one-7-ol; oxidizing said 2-ketone to form 3,5-octadiene-2,7-dione; and thereafter partially hydrogenating the resulting 3,5-octadiene-2,7-dione with one mole proportion of hydrogen to form 4-octene-2,7-dione.

5. The process which comprises reacting sorbaldehyde with a basic metal acetylide to form the 3-carbinol, 4,6-octadiene-1-yn-3-ol; subjecting said 3-carbinol to allylic rearrangement in the presence of an aqueous acid to form the 7-carbinol, 3,5-octadiene-1-yn-7-ol; hydrating the acetylenic bond of said 7-carbinol with one mole proportion of water in an aqueous medium containing an acidic material and a mercury compound to form the 2-ketone, 3,5-octadiene-2-one-7-ol; oxidizing said 2-ketone in the presence of manganese dioxide to form 3,5-octadiene-2,7-dione; and thereafter partially hydrogenating the resulting 3,5-octadiene-2,7-dione with one mole proportion of hydrogen to form 4-octene-2,7-dione.

6. The process which comprises reacting sorbaldehyde with lithium acetylide to form the 3-carbinol, 4,6-octadiene-1-yn-3-ol; subjecting said 3-carbinol to allylic rearrangement in the presence of aqueous sulfuric acid to form the 7-carbinol, 3,5-octadiene-1-yn-7-ol; oxidizing said 7-carbinol in the presence of manganese dioxide to form the 7-ketone, 3,5-octadiene-1-yn-7-one; hydrating the acetylenic bond of said 7-ketone with one mole proportion of water in an aqueous medium containing sulfuric acid and mercuric sulfate to form 3,5-octadiene-2,7-dione; and thereafter partially hydrogenating the resulting 3,5-octadiene-2,7-dione with one mole proportion of hydrogen in a pyridine solvent medium containing zinc and acetic acid to form 4-octene-2,7-dione.

7. The process which comprises reacting sorbaldehyde with lithium acetylide to form the 3-carbinol, 4,6-octadiene-1-yn-3-ol; subjecting said 3-carbinol to allylic rearrangement in the presence of aqueous sulfuric acid to form the 7-carbinol, 3,5-octadiene-1-yn-7-ol; hydrating the acetylenic bond of said 7-carbinol with one mole proportion of water in an aqueous medium containing mercuric oxide and sulfuric acid to form the 2-ketone, 3,5-octadiene-2-one-7-ol; oxidizing said 2-ketone in the presence of manganese dioxide to form 3,5-octadiene-2,7-dione; and thereafter partially hydrogenating the resulting 3,5-octadiene-2,7-dione with one mole proportion of hydrogen in a pyridine solvent medium containing zinc and acetic acid to form 4-octene-2,7-dione.

References Cited in the file of this patent

UNITED STATES PATENTS

| 2,106,181 | Kreimeier | Jan. 25, 1938 |
| 2,263,378 | Carter | Nov. 18, 1941 |
| 2,560,921 | Bergmann | July 17, 1951 |
| 2,809,216 | Inhoffen et al. | Oct. 8, 1957 |

FOREIGN PATENTS

| 818,348 | Germany | Oct. 25, 1951 |
| 818,349 | Germany | Oct. 25, 1951 |
| 835,144 | Germany | Mar. 27, 1952 |

OTHER REFERENCES

Campbell et al.: Chem. Reviews, vol. 31, pp. 96, 127–8 (1942).